US011807214B2

United States Patent
Tokura et al.

(10) Patent No.: US 11,807,214 B2
(45) Date of Patent: Nov. 7, 2023

(54) TRAVEL CONTROL DEVICE, TRAVEL CONTROL METHOD, NON-TRANSITORY STORAGE MEDIUM, AND VEHICLE FOR DECIDING A POWER SOURCE FOR TRAVELING BASED ON A PREDICTED AMOUNT OF REGENERATIVE ENERGY AND THERMAL INFORMATION

(71) Applicant: TOYOTA JIDOSHA KABUSHIKI KAISHA, Toyota (JP)

(72) Inventors: Takaaki Tokura, Nagoya (JP); Katsumi Kono, Toyota (JP); Takeshi Yasuda, Kuwana (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 17/016,096

(22) Filed: Sep. 9, 2020

(65) Prior Publication Data
US 2021/0179063 A1 Jun. 17, 2021

(30) Foreign Application Priority Data
Dec. 11, 2019 (JP) .................................. 2019-223691

(51) Int. Cl.
*B60W 20/13* (2016.01)
*B60W 20/12* (2016.01)
(Continued)

(52) U.S. Cl.
CPC ............. *B60W 20/13* (2016.01); *B60L 58/24* (2019.02); *B60W 10/06* (2013.01); *B60W 10/08* (2013.01);
(Continued)

(58) Field of Classification Search
CPC ...... B60W 20/13; B60W 10/06; B60W 10/08; B60W 20/12; B60W 30/18127;
(Continued)

(56) References Cited

U.S. PATENT DOCUMENTS

2011/0046835 A1* 2/2011 Taguchi ................ B60W 20/12
903/902
2012/0041629 A1 2/2012 Yamada et al.
(Continued)

FOREIGN PATENT DOCUMENTS

JP 2009-274610 A 11/2009
JP 2010-234972 A 10/2010
(Continued)

OTHER PUBLICATIONS

U.S. Appl. No. 17/096,442, filed Nov. 12, 2020 in the name of Tokura et al.

*Primary Examiner* — Geepy Pe
*Assistant Examiner* — Sean Patrick Reidy
(74) *Attorney, Agent, or Firm* — Oliff PLC

(57) ABSTRACT

A travel control device is mounted on a vehicle including an electric motor and an internal combustion engine that are power sources and a storage battery that stores energy for driving the electric motor and regenerative energy recovered by regenerative braking of the electric motor. The travel control device includes an electronic control device configured to create a speed profile in which a speed of the vehicle is predicted, estimate a predicted amount of the regenerative energy to be recovered, based on the speed profile, and decide the power source to be used for traveling, based on (Continued)

the predicted amount of the regenerative energy and thermal information indicating a demand related to heat of the vehicle.

10 Claims, 8 Drawing Sheets

(51) Int. Cl.
*B60L 58/24* (2019.01)
*B60W 10/06* (2006.01)
*B60W 10/08* (2006.01)
*B60W 30/18* (2012.01)
*B60W 40/105* (2012.01)

(52) U.S. Cl.
CPC ...... *B60W 20/12* (2016.01); *B60W 30/18127* (2013.01); *B60W 40/105* (2013.01); *B60W 2510/246* (2013.01)

(58) Field of Classification Search
CPC ......... B60W 40/105; B60W 2510/246; B60W 20/14; B60W 2520/10; B60W 2710/246; B60W 50/0097; B60W 10/26; B60L 58/24; B60L 7/10; Y02T 10/70; Y02T 10/7072; Y02T 90/14

USPC ........................................................ 701/22
See application file for complete search history.

(56) References Cited

U.S. PATENT DOCUMENTS

| | | | |
|---|---|---|---|
| 2013/0173107 A1* | 7/2013 | Kokon ................. | B60W 10/18 903/930 |
| 2015/0025727 A1* | 1/2015 | Engman ............. | G01C 21/3407 903/930 |
| 2016/0082947 A1* | 3/2016 | Naumann ............. | B60W 20/11 701/22 |
| 2018/0273021 A1 | 9/2018 | Morimoto et al. | |
| 2019/0217844 A1* | 7/2019 | Pursifull ............... | B60W 10/06 |
| 2019/0276002 A1 | 9/2019 | Ito | |
| 2020/0290464 A1* | 9/2020 | Oh ........................ | B60W 40/13 |
| 2020/0346648 A1* | 11/2020 | Vanterpool ........... | B60W 20/12 |
| 2021/0164792 A1* | 6/2021 | Pal ......................... | G06Q 40/08 |
| 2021/0394580 A1* | 12/2021 | Chopard ................. | B60L 53/10 |

FOREIGN PATENT DOCUMENTS

| | | |
|---|---|---|
| JP | 4702086 B2 | 6/2011 |
| JP | 2017-087915 A | 5/2017 |
| JP | 2018-083574 A | 5/2018 |

\* cited by examiner

TRAVEL CONTROL DEVICE, TRAVEL CONTROL METHOD, NON-TRANSITORY STORAGE MEDIUM, AND VEHICLE FOR DECIDING A POWER SOURCE FOR TRAVELING BASED ON A PREDICTED AMOUNT OF REGENERATIVE ENERGY AND THERMAL INFORMATION

CROSS REFERENCE TO RELATED APPLICATION

This application claims priority to Japanese Patent Application No. 2019-223691 filed on Dec. 11, 2019, incorporated herein by reference in its entirety.

BACKGROUND

1. Technical Field

The disclosure relates to a travel control device, a travel control method, a non-transitory storage medium, and a vehicle.

2. Description of Related Art

In a hybrid vehicle including an electric motor and an internal combustion engine, it is possible to improve fuel efficiency by travel control in which the electric motor and the internal combustion engine are efficiently used. In the hybrid vehicle, it is significant to perform heat management such as securing a heat source for heating a vehicle cabin and cooling or heating a storage battery that provides driving energy (electric power) to an electric motor.

Japanese Patent No. 4702086 (JP 4702086 B) discloses a vehicle driving assistance device that guides, to a user, a brake start point at which a regenerative braking operation needs to be started, based on a position of a vehicle and map information on a stop-needed point or a deceleration-needed point such as a railroad crossing or a curve. In the vehicle driving assistance device, a user can be prompted to operate the regenerative brake at a deceleration that enables efficient recovery of regenerative energy, and a recovery amount of the regenerative energy can be increased.

SUMMARY

In the technology of JP 4702086 B, it is possible to predict a point where recovery of regenerative energy can be expected, but it is not possible to quantitatively predict a recovery amount of regenerative energy. When a recovery amount of regenerative energy can be quantitatively predicted early, it may be used for suitable travel control of a vehicle including heat management.

The disclosure provides a travel control device that quantitatively predicts a recovery amount of regenerative energy to perform suitable travel control of a vehicle including heat management.

A first aspect of the disclosure relates to a travel control device mounted on a vehicle including an electric motor and an internal combustion engine that are power sources and a storage battery that stores energy for driving the electric motor and regenerative energy recovered by regenerative braking of the electric motor. The travel control device includes an electronic control device configured to create a speed profile in which a speed of the vehicle is predicted, estimate a predicted amount of the regenerative energy to be recovered, based on the speed profile, and decide the power source to be used for traveling, based on the predicted amount of the regenerative energy and thermal information indicating a demand related to heat of the vehicle.

According to the first aspect, since a speed profile in which the speed of the vehicle is predicted is created, it is possible to quantitatively predict a recovery amount of regenerative energy based on the speed profile, and it is possible to provide a travel control device that performs suitable travel control of a vehicle including heat management based on the predicted recovery amount of the regenerative energy and thermal information indicating a demand related to heat.

In the travel control device according to the first aspect, the electronic control device may be configured to estimate the predicted amount of the regenerative energy for each period divided at timings when the speed of the vehicle in the speed profile is zero, based on the speed profile. Further, the electronic control device may be configured to derive, for each period, driving energy to be supplied to the electric motor based on the thermal information and the predicted amount of the regenerative energy in the period, and decide that energy is supplied to the electric motor by an amount of the driving energy and used for traveling, in the period.

In the travel control device according to the first aspect, the electronic control device may be configured to, when a length of any of the periods is less than a first period, set the period and one or more subsequent consecutive periods as one connection period, derive the driving energy to be supplied to the electric motor based on the thermal information and a predicted amount of the regenerative energy in the connection period, and decide that energy is supplied to the electric motor by an amount of the driving energy and used for traveling, in the connection period.

In the travel control device according to the first aspect, the electronic control device may be configured to derive the driving energy so as to be smaller than the predicted amount of the regenerative energy when a demand to generate exhaust heat of the internal combustion engine is acquired as the thermal information.

In the travel control device according to the first aspect, the electronic control device may be configured to derive the driving energy so as to be smaller than the predicted amount of the regenerative energy when a demand to cool the storage battery is acquired as the thermal information.

In the travel control device according to the first aspect, the electronic control device may be configured to derive the driving energy so as to be larger than the predicted amount of the regenerative energy when a demand to heat the storage battery is acquired as the thermal information.

In the travel control device according to the first aspect, the electronic control device may be configured to further acquire a position of a charging facility, and derive the driving energy such that stored energy of the storage battery becomes small as the vehicle approaches the charging facility.

In the travel control device according to the first aspect, the electronic control device may be configured to further acquire a position of a facility of an electric power providing destination, and derive the driving energy such that the stored energy of the storage battery becomes large as the vehicle approaches the facility of the electric power providing destination.

In the travel control device according to the first aspect, the electronic control device may be configured to create the speed profile based on a past travel history.

A second aspect of the disclosure relates to a travel control method executed by a travel control device mounted on a vehicle including an electric motor and an internal combustion engine that are power sources and a storage battery that stores energy for driving the electric motor and regenerative energy recovered by regenerative braking of the electric motor. The travel control method includes creating a speed profile that predicts a speed of the vehicle, estimating a predicted amount of the regenerative energy to be recovered, based on the speed profile, and deciding the power source to be used for traveling, based on the predicted amount of the regenerative energy and thermal information indicating a demand related to heat of the vehicle.

A third aspect of the disclosure relates to a non-transitory storage medium storing instructions that are executable by one or more processors mounted on a vehicle including an electric motor and an internal combustion engine that are power sources and a storage battery that stores energy for driving the electric motor and regenerative energy recovered by regenerative braking of the electric motor, and that cause the one or more processors to perform functions. The non-transitory storage medium includes creating a speed profile that predicts a speed of the vehicle, estimating a predicted amount of the regenerative energy to be recovered, based on the speed profile, and deciding the power source to be used for traveling, based on the predicted amount of the regenerative energy and thermal information indicating a demand related to heat of the vehicle.

A fourth aspect of the disclosure relates to a vehicle. The vehicle includes an electric motor that is a power source, an internal combustion engine that is a power source, a storage battery that stores energy for driving the electric motor and regenerative energy recovered by regenerative braking of the electric motor, and a travel control device. The travel control device is configured to create a speed profile in which a speed of the vehicle is predicted, estimate a predicted amount of the regenerative energy to be recovered, based on the speed profile, and decide the power source to be used for traveling, based on the predicted amount of the regenerative energy and thermal information indicating a demand related to heat of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

An embodiment of the disclosure will be described below with reference to the drawings. A travel control device according to the present embodiment quantitatively predicts a recovery amount of regenerative energy early by using a speed profile in which a speed of a vehicle is predicted. Based on a predicted result and thermal information that demands generation of heat for a specific device, an opportunity to travel using an electric motor and an opportunity to travel using an internal combustion engine are adjusted to perform travel control including suitable heat management of the vehicle.

Configuration

Figure 1:
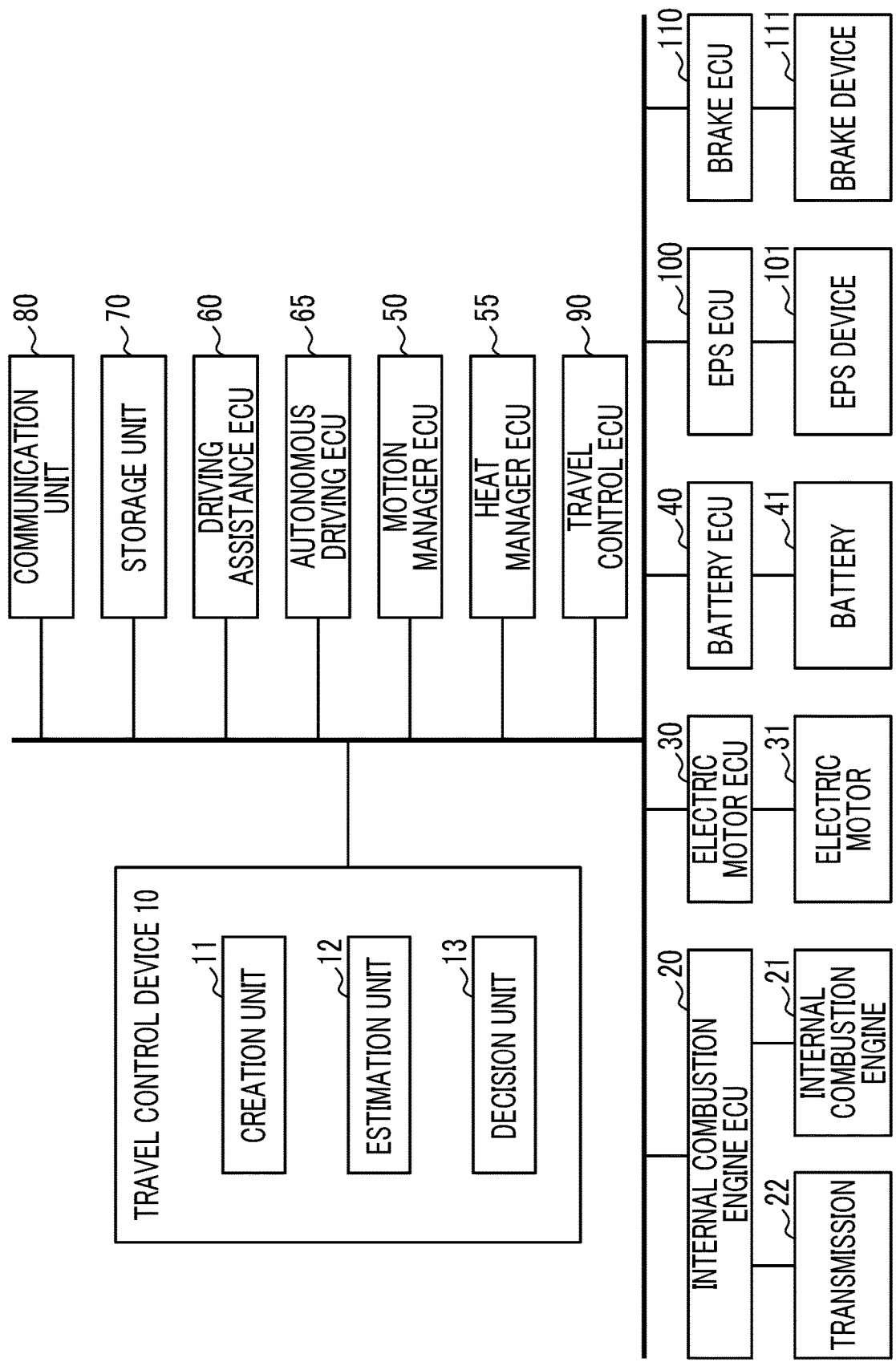
FIG. 1 illustrates functional blocks of a travel control device according to an embodiment of the disclosure and a peripheral portion thereof.

FIG. 1 illustrates functional blocks of a travel control device 10 according to the present embodiment and a peripheral portion thereof. The travel control device 10 is mounted on a vehicle. The vehicle includes, in addition to the travel control device, an internal combustion engine ECU 20, an internal combustion engine 21, a transmission 22, an electric motor ECU 30, an electric motor 31, a battery ECU 40, a battery 41, a motion manager ECU 50, a heat manager ECU 55, a driving assistance ECU 60, an autonomous driving ECU 65, a storage unit 70, a communication unit 80, a travel control ECU 90, an EPS ECU 100, an EPS device 101, a brake ECU 110, and a brake device 111.

In addition, the vehicle may include various sensors such as an accelerator pedal sensor, a brake pedal sensor, a camera or an obstacle sensor, a vehicle speed sensor, a yaw rate sensor, a GPS sensor, a coolant temperature sensor, a current sensor of the battery 41, a voltage sensor, and a temperature sensor, and various devices such as a navigation system and an air conditioner, but the illustration thereof will be omitted.

The internal combustion engine 21 and the electric motor 31 are actuators that serve as a power source for driving the vehicle. The electric motor 31 is also a generator that generates power and a braking device that generates a braking force by regenerative braking.

The internal combustion engine ECU 20 is an electronic control unit (ECU) that controls the internal combustion engine 21 and the transmission 22 that changes a rotation speed between the input and the output such that a driving torque is generated or a braking torque by an engine brake is generated.

The electric motor ECU 30 is an ECU that controls the electric motor 31 such that a driving torque is generated or a braking torque by a regenerative brake is generated.

The battery 41 is a storage battery that supplies electric power to the electric motor 31 and other devices by discharging, or that charges the amount of electric power (recovered energy) obtained by regenerative braking of the electric motor 31. The battery ECU 40 is an ECU that acquires the state of the battery 41 from various sensors to monitor the voltage, current, temperature, charge rate, power storage amount, or the like, or that controls charging/discharging of the battery 41 in response to the state of the battery 41 or a demand from other ECUs or the like.

The travel control ECU 90 is an ECU that controls the internal combustion engine ECU 20 and the electric motor ECU 30 according to a traveling mode described later.

The electric power steering (EPS) device 101 is an actuator that performs steering for changing a steering angle of wheels to change a traveling direction of a vehicle. The EPS ECU 100 is an ECU that controls the EPS device 101.

The brake device 111 (foot brake device) is an actuator that generates a braking force by a frictional force applied to a member that rotates together with a wheel. The brake ECU 110 is an ECU that controls the brake device 111.

The driving assistance ECU 60 is an ECU that performs functions of driving assistance such as collision avoidance, front vehicle following, and lane keeping. The driving assistance ECU 60 outputs an instruction to control the motion of the vehicle such as acceleration/deceleration and steering angle based on the information acquired from various sensors and the like. The function and number of the driving assistance ECUs 60 are not limited.

The autonomous driving ECU 65 outputs an instruction to control the motion of the vehicle such as acceleration/deceleration and steering angle based on the information acquired from various sensors and the like in order to perform the function of the autonomous driving.

The motion manager ECU 50 gives instructions to the travel control ECU 90, the EPS ECU 100, the brake ECU 110, and the like (hereinafter, these will be collectively referred to as actuator ECUs) based on instructions from the driving assistance ECU 60, the autonomous driving ECU 65, and the like. For example, the acceleration instruction is given to the travel control ECU 90, the steering instruction is given to the EPS ECU 100, and the deceleration instruction is given to the travel control ECU 90 and the brake ECU 110.

When instructions are received from a plurality of the driving assistance ECUs 60 and the like, the motion manager ECU 50 performs a process called arbitration, which decides which instruction to control the vehicle, according to a predetermined rule, and gives an instruction to the actuator ECU based on an arbitration result. Operation contents on the steering wheel, the brake pedal, the accelerator pedal, and the like of a user may be acquired by the motion manager ECU 50 to be subjected to the arbitration process by the motion manager ECU 50. Alternatively, the operation contents may be acquired by the actuator ECU, and the actuator ECU may arbitrate the manual driving operation of the user and the instruction from the motion manager ECU 50 individually.

The heat manager ECU 55 generates and outputs thermal information indicating a demand to generate heat or release heat to the outside of the vehicle, based on the information acquired from various sensors and the operation information acquired from devices such as air conditioners. The thermal information is indicated, for example, in a format that demands a specific device to generate or release heat. For example, when the air conditioner is performing the vehicle cabin heating operation but the temperature of the coolant is relatively low and the heat is insufficient, the heat manager ECU 55 generates thermal information indicating a demand to generate heat by exhaust heat of the internal combustion engine 21 in order to obtain heat for heating.

In addition, for example, when the temperature of the battery 41 deviates from an appropriate temperature range in which efficient charging/discharging is possible, the heat manager ECU 55 generates thermal information that demands the battery 41 to release or generate heat in order to cool or heat the battery to an appropriate temperature.

Devices such as other ECUs can appropriately acquire thermal information and use the information for each control. In particular, a plurality of devices operates in cooperation with each other to efficiently transfer heat, thereby achieving energy saving. In the present embodiment, as will be described later, an example in which the travel control device 10 uses thermal information for control will be described.

The storage unit 70 stores one or more travel histories of a user. The travel history is information including the speed of the vehicle at each time point during the driving period when the user was driven the vehicle in the past. The storage unit 70 generates a travel history by periodically storing the vehicle speed acquired from a vehicle speed sensor or the like included in the vehicle while the vehicle is in the power-on state, for example. The storage unit 70 may be provided as a part of a car navigation system, for example.

The communication unit 80 can wirelessly communicate with a server outside the vehicle, another vehicle, or the like, and can receive a travel history of a driver other than the user, which is obtained based on a travel result of the other vehicle.

The travel control device 10 is an ECU including a creation unit 11, an estimation unit 12, and a decision unit 13. The creation unit 11 creates a speed profile based on the travel history. The estimation unit 12 estimates a predicted amount of regenerative energy that is energy that can be recovered by regenerative braking based on the speed profile. The decision unit 13 decides which of the electric motor 31 and the internal combustion engine 21 is used for traveling, based on the predicted amount of the regenerative energy.

Each of the above ECUs is typically a computer including a memory and a processor. The processor of each ECU implements a function by, for example, reading and executing a program stored in a non-transitory memory. These ECUs are connected to each other by a communication line and can operate cooperatively by appropriately communicating with each other.

The configurations of the devices mounted on the vehicle and the configuration of the travel control device 10 described above are merely examples, and additions, replacements, changes, and omissions can be appropriately made. Further, the functions of each device can be appropriately integrated into one device or distributed to a plurality of devices for implementation.

For example, the travel control device 10 may be provided as an independent ECU, and may be provided as a part of the motion manager ECU 50, the travel control ECU 90, or the like. The function of the travel control device 10 may be distributed to and provided in the motion manager ECU 50, the travel control ECU 90, or the like.

For example, the travel control device 10, the driving assistance ECU 60, the autonomous driving ECU 65, the motion manager ECU 50, the travel control ECU 90, and the like may be provided as one ECU. Further, for example, the autonomous driving ECU 65 may not be provided.

Process

Figure 2:
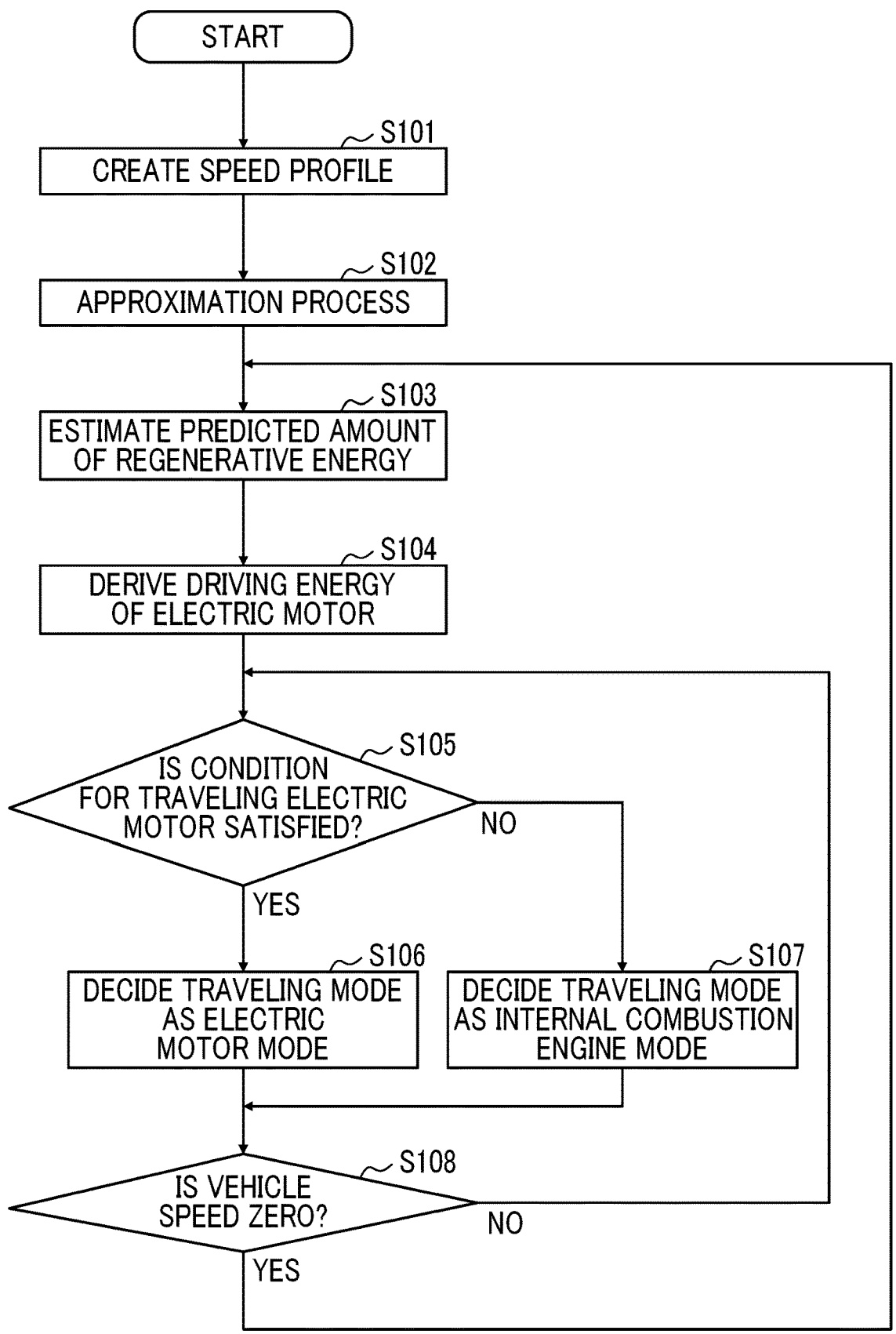
FIG. 2 illustrates a flowchart of a travel control process according to the embodiment of the disclosure.

Details of the process according to the present embodiment will be described below. FIG. 2 is a flowchart of a process performed by the travel control device 10. This process is started, for example, when the user starts a trip with the vehicle in the power-on state, and is performed until the user finishes the trip with the vehicle in the power-off state.

(Step S101): The creation unit 11 creates a speed profile. The speed profile is information indicating the predicted speed of the vehicle at each time point of the current trip.

Figure 3:
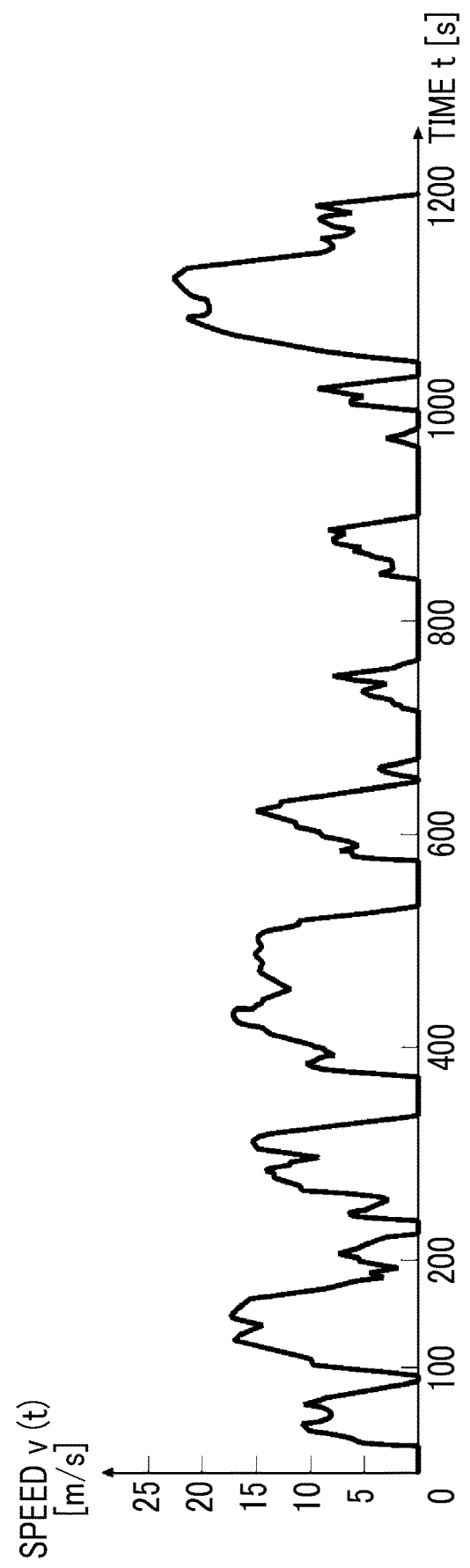
FIG. 3 illustrates an example of a speed profile according to the embodiment of the disclosure.

FIG. 3 illustrates an example of a speed profile. In FIG. 3, the horizontal axis represents an elapsed time from the start of the trip, and the vertical axis represents a vehicle speed. As an example, a speed profile based on the speed change pattern used in the fuel consumption rate test (JC08 mode) defined in Japan is illustrated. The graph of the speed profile generally includes a plurality of peaks, which indicates that acceleration and deceleration are repeated during one trip.

The creation unit 11 can create a speed profile, for example, based on the travel history stored in the storage unit 70. In a simple example, when the travel pattern of the user is solely a pattern of traveling on the same route during the same time period on weekdays for commuting, it is considered that the patterns of changes in speed over time included in the travel history are substantially the same. In such a case, the creation unit 11 may create the speed profile based on any of the past travel histories.

The storage unit 70 may classify and store the travel history in association with the attributes such as the day of the week and the time period in which the vehicle has traveled, and the creation unit 11 may create the speed profile based on the travel history that has a large number of matches with the attributes such as the day of the week and the time period of the current trip. Accordingly, even in a case of a user who has one or more travel patterns, when the travel patterns are common to each attribute, the travel pattern can be specified with a certain accuracy and a speed profile can be created with high accuracy.

The storage unit 70 may acquire a travel route from a navigation system or the like included in the vehicle and store the travel route in the travel history, and the creation unit 11 may create a speed profile based on the travel history having a high similarity to the travel route of the current trip. This method can be executed when a user sets a travel route in the navigation system or the like in the current trip and the creation unit 11 can acquire the set travel route, but the accuracy of the speed profile can be improved.

When a travel route is set for the current trip, the creation unit 11 may make an inquiry to the server via the communication unit 80 about road traffic information such as a speed limit along a travel route and traffic congestion prediction, and create a speed profile based on the road traffic information. Further, the server that can create a speed profile based on the road traffic information along the travel route may be demanded to create the speed profile via the communication unit 80, and the created speed profile may be acquired.

The creation unit 11 may acquire a travel history of a driver other than the user via the communication unit 80 and create a speed profile based on the travel history. The server may collect, for example, travel histories associated with days of the week, time periods, travel routes, and the like from a large number of vehicles, and classify and store the travel histories, and the creation unit 11 may make an inquiry to the server to acquire a travel history having a high degree of matching with the current trip in the classification, and use as a speed profile based on the travel history.

In addition, the server may divide a plurality of people into groups and store a travel history of each person for each group, and the creation unit 11 may create a speed profile based on the travel history selected from the same group as a user. For example, when people in the same area at home and the workplace are in the same group, the accuracy of a speed profile when traveling for commuting can be improved.

Alternatively, the creation unit 11 may acquire, from one or more other vehicles via the communication unit 80 instead of the server, travel histories stored in the vehicles, and create a speed profile based on the travel histories, in the same manner as described above.

In each of the above-described methods, when there are a plurality of travel histories that is candidates for the speed profile, for example, the creation unit 11 may use any one of the travel histories as a speed profile, and use an average of the travel histories as a speed profile. The method of creating the speed profile is not limited, and the above described methods may be combined as appropriate. Further, a speed profile may be created using one of a travel history of a user and a travel history of a driver other than the user, or a speed profile may be created using the both.

Figure 4:
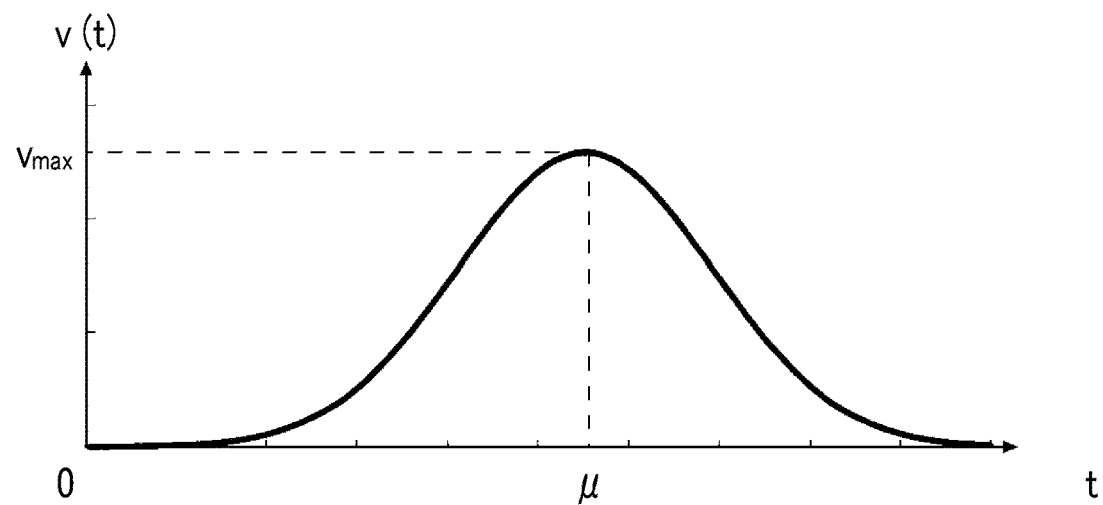
FIG. 4 illustrates a graph of a Gaussian function.

(Step S102): The estimation unit 12 approximates a speed profile with a predetermined approximation model. In the present embodiment, the sum of Gaussian functions is used for the approximation. FIG. 4 illustrates a graph (t≥0) of the Gaussian function having time t as a variable, represented by (Expression 1). Here, $\mu$, $v_{max}$, and $\sigma$ are parameters that define a peak position (time), a peak value, and a distribution spread, respectively.

$$v(t) = v_{max} \cdot \exp\left(\frac{-(t-\mu)^2}{2\sigma^2}\right) \quad \text{Expression 1}$$

Figure 5:
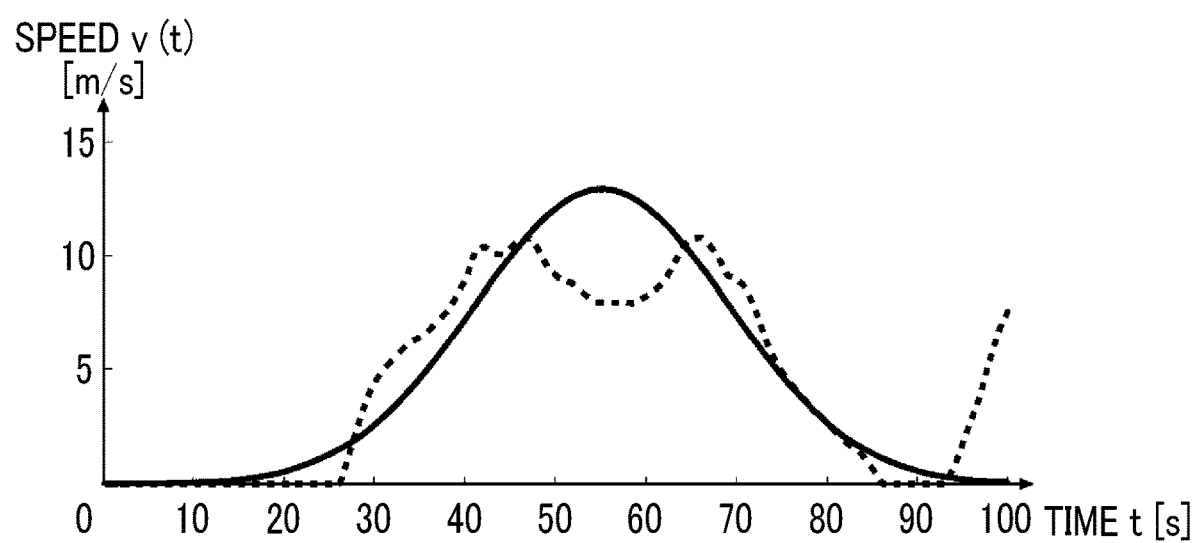
FIG. 5 illustrates a part of an example of the speed profile according to the embodiment of the disclosure and a graph obtained by approximating the speed profile with a Gaussian function.

FIG. 5 illustrates a graph obtained by appropriately setting the parameters $\mu$, $v_{max}$, and $\sigma$ in (Expression 1) and approximating the speed change in the 0≤t≤100 (seconds) portion of the speed profile illustrated in FIG. 3. In FIG. 5, the speed profile is shown by a dotted line and the approximate graph is shown by a solid line.

In the present embodiment, the entire speed profile is approximated by the sum of Gaussian functions having different peak positions $\mu_i$. Each Gaussian function may have different peak values $v_{maxi}$ and distribution spreads $\sigma_i$. When the number of Gaussian functions to be used is N, an approximate expression can be represented by (Expression 2) using $\mu_i$, $v_{maxi}$, and $\sigma_i$ (i=1, 2, . . . , N) as parameters.

$$v(t) = \sum_{i=1}^{N} v_{maxi} \cdot \exp\left(\frac{-(t-\mu_i)^2}{2\sigma_i^2}\right) \quad \text{Expression 2}$$

Here, as the parameters $\mu_i$, $v_{maxi}$, and $\sigma_i$ (i=1, 2, . . . , N), suitable values can be derived by using a known fitting method. For example, the absolute value of the difference between a speed value V(t) of the speed profile and an approximate value v(t) may be set such that an integral value S obtained by integrating over the entire period (0≤t≤T) of the speed profile becomes the minimum value. The integral value S is represented by (Expression 3).

$$S = \int_0^T |V(t) - v(t)| dt \quad \text{Expression 3}$$

Figure 6:
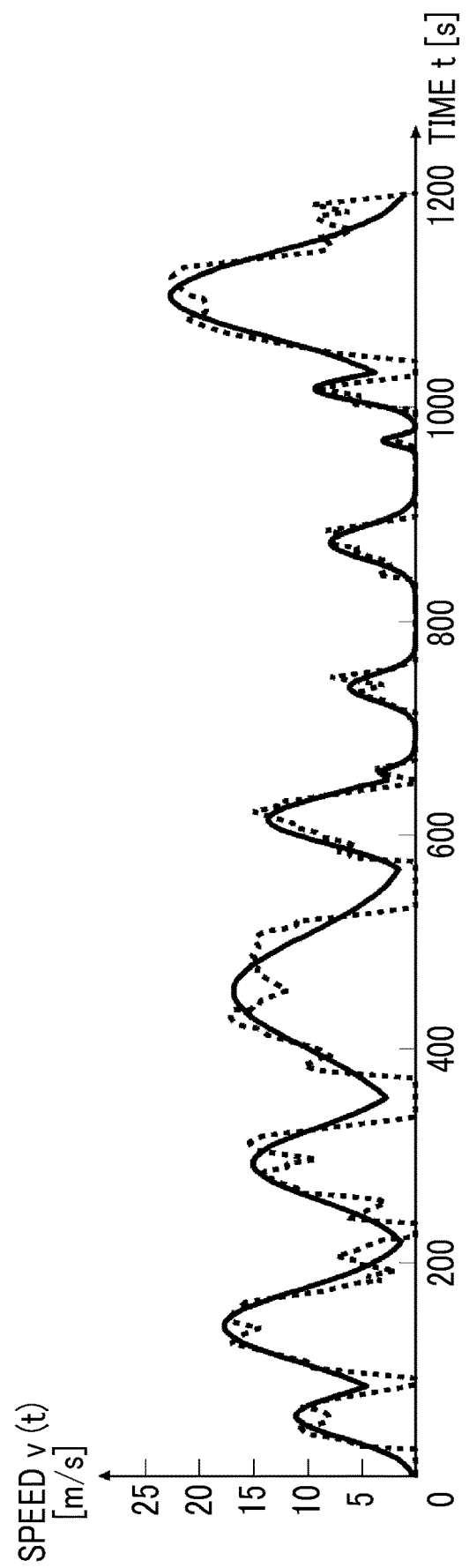
FIG. 6 illustrates an example of the speed profile according to the embodiment of the disclosure and a graph obtained by approximating the speed profile with a Gaussian function.

FIG. 6 illustrates a graph obtained by deriving the parameters $\mu_i$, $v_{maxi}$, and $\sigma i$ (i=1, 2, . . . , N) of (Expression 2) using this method and approximating the speed change over the entire period of the speed profile shown in FIG. 3. In FIG.

6, the speed profile is shown by a dotted line and the approximate graph is shown by a solid line.

As illustrated in FIG. 6, it can be seen that a good approximation characterizing the speed change in one trip is obtained. As an example, the value of N is set such that the speed profile is equal to the number of periods divided at the timing when the speed is zero. Further, the parameters $\mu_i$, $v_{maxi}$, and $\sigma_i$ (i=1, 2, ..., N) are set so as to have peaks in the i-th period.

(Step S103): The estimation unit 12 estimates a predicted amount of the regenerative energy, which is energy obtained by regenerative braking of the electric motor 31, using the approximate model. This step is performed at the start of each period, and the estimation unit 12 estimates a predicted amount of regenerative energy in the period. The estimation method will be described below.

First, the estimation unit 12 derives requested power P(t) which is power to be given to the vehicle in order to maintain the speed v(t). P(t) is represented by (Expression 4).

$$P(t) = m \cdot \frac{dv(t)}{dt} \cdot v(t) + \{a \cdot (v(t))^2 + b \cdot v(t) + c\} \cdot v(t) \quad \text{Expression 4}$$

Here, m is the weight of the vehicle. m·dv(t)/dt represents the change rate of the momentum of the vehicle, and a·(v(t))²+b·v(t)+c represents the traveling resistance. The requested power P(t) is the sum of the change rate of the momentum of the vehicle and the traveling resistance multiplied by the vehicle speed v(t). That is, the requested power P(t) is the sum of the power that contributes to a change in kinetic energy of the vehicle and the power that is dissipated by the traveling resistance, and is the power requested to achieve the speed v(t) at time t. The traveling resistance can be suitably approximated by expressing the value as the sum of a component proportional to the square of the speed, a component proportional to the first power of the speed, and a constant component as represented in (Expression 4).

Figure 7:
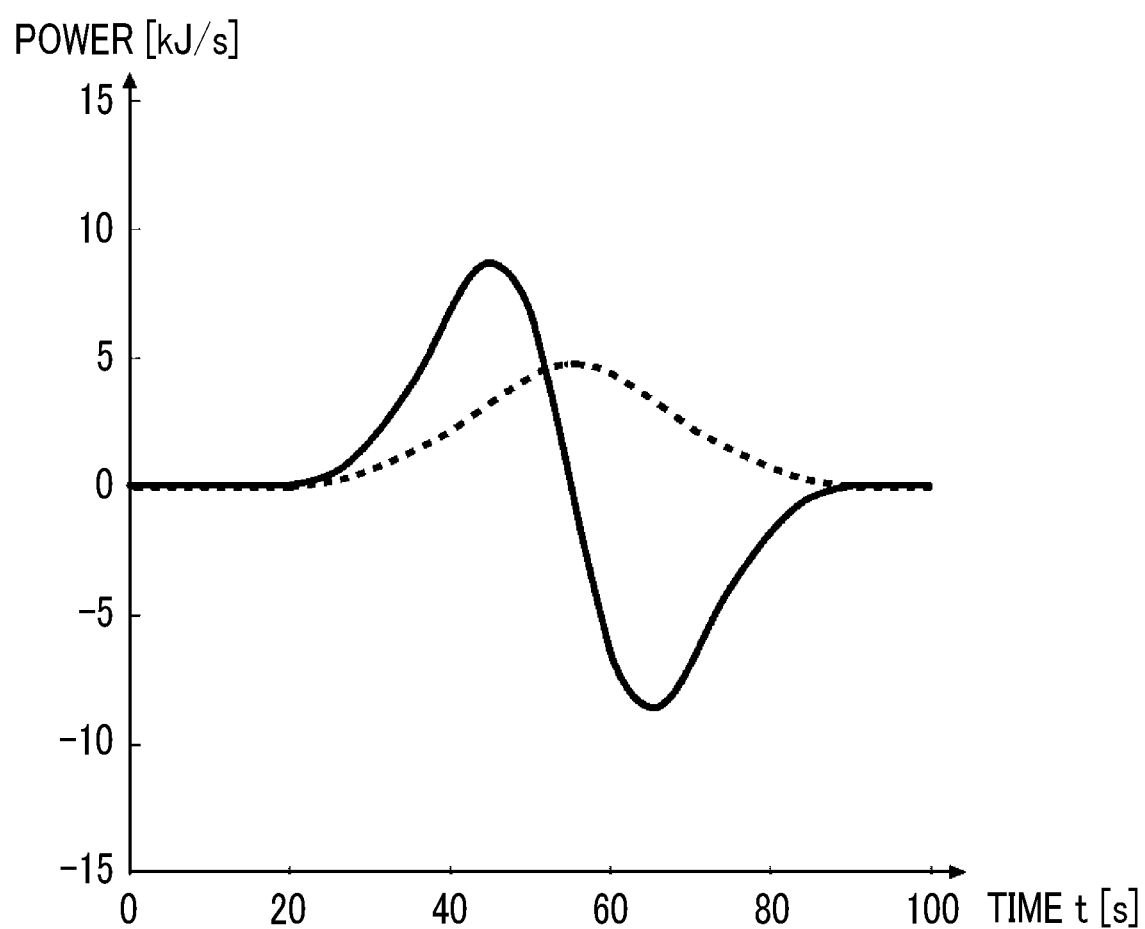
FIG. 7 illustrates a graph of an example of the amount contributing to a change in kinetic energy and the amount that is dissipated by traveling resistance, in requested power according to the embodiment of the disclosure.

In FIG. 7, the horizontal axis represents time, the vertical axis represents power, and in the requested power P(t) in the 0≤t≤100 (seconds) portion of the speed profile illustrated in FIG. 3, an example of the amount contributing to a change in kinetic energy (first term on the right side of Expression 4) is shown by a solid line, and an example of the amount dissipated by the traveling resistance (second term on the right side of Expression 4) is shown by a dotted line.

Figure 8:
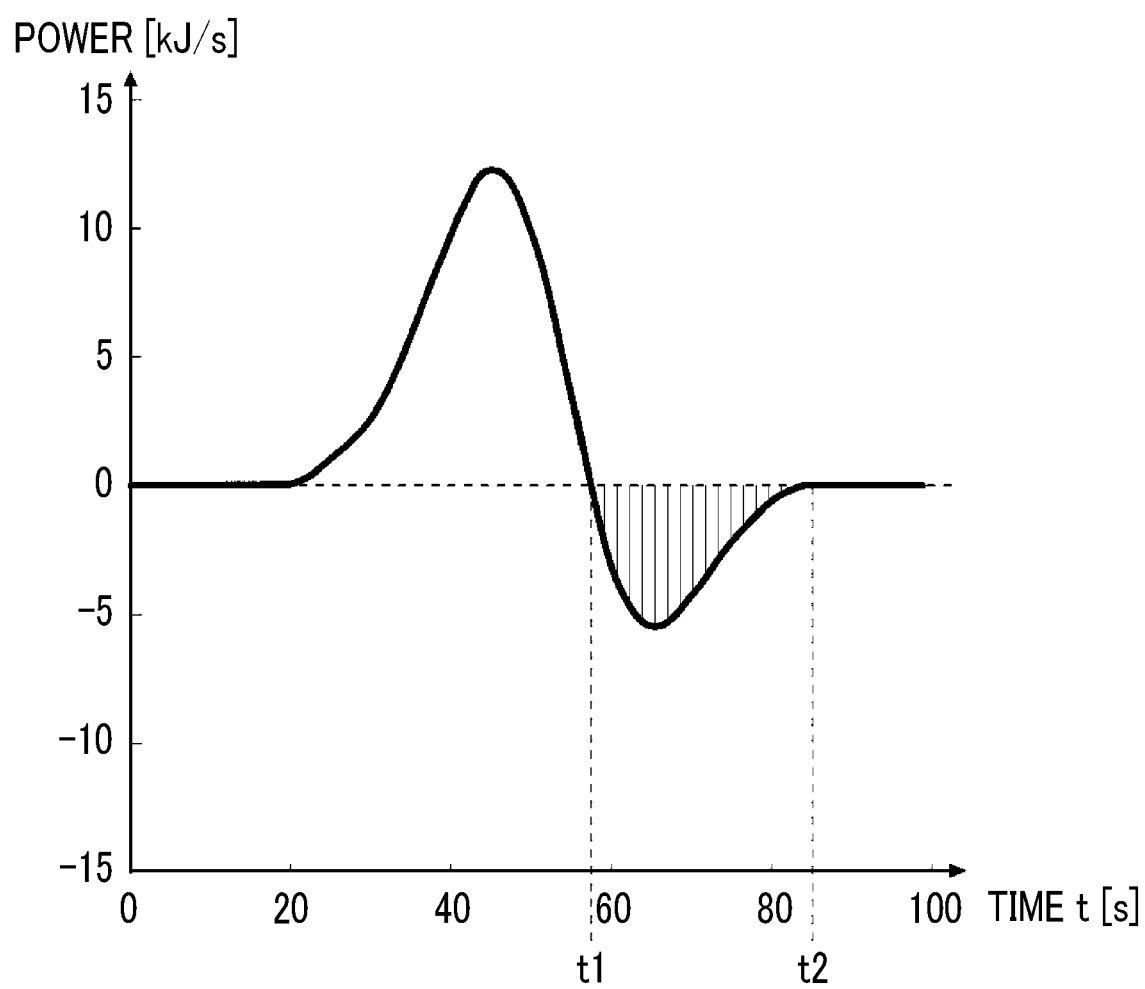
FIG. 8 illustrates a graph of an example of the requested power according to the embodiment of the disclosure.

FIG. 8 illustrates a graph of the total amount of the requested power P(t), where the horizontal axis represents time, the vertical axis represents power.

Next, the estimation unit 12 estimates a predicted recovery amount of regenerative energy based on the requested power P(t). In the graph illustrated in FIG. 8, it is predicted that the regenerative energy can be recovered at the time (t1<t<t2) when the value of the requested power P(t) becomes negative. Further, the integral value of the magnitude of the requested power at this time represented in (Expression 5), that is, the area of the region shown by hatching in FIG. 8, is an estimated value E of a predicted amount of the regenerative energy to be recovered.

$$E = \int_{t1}^{t2} |P(t)| dt \quad \text{Expression 5}$$

Figure 9:
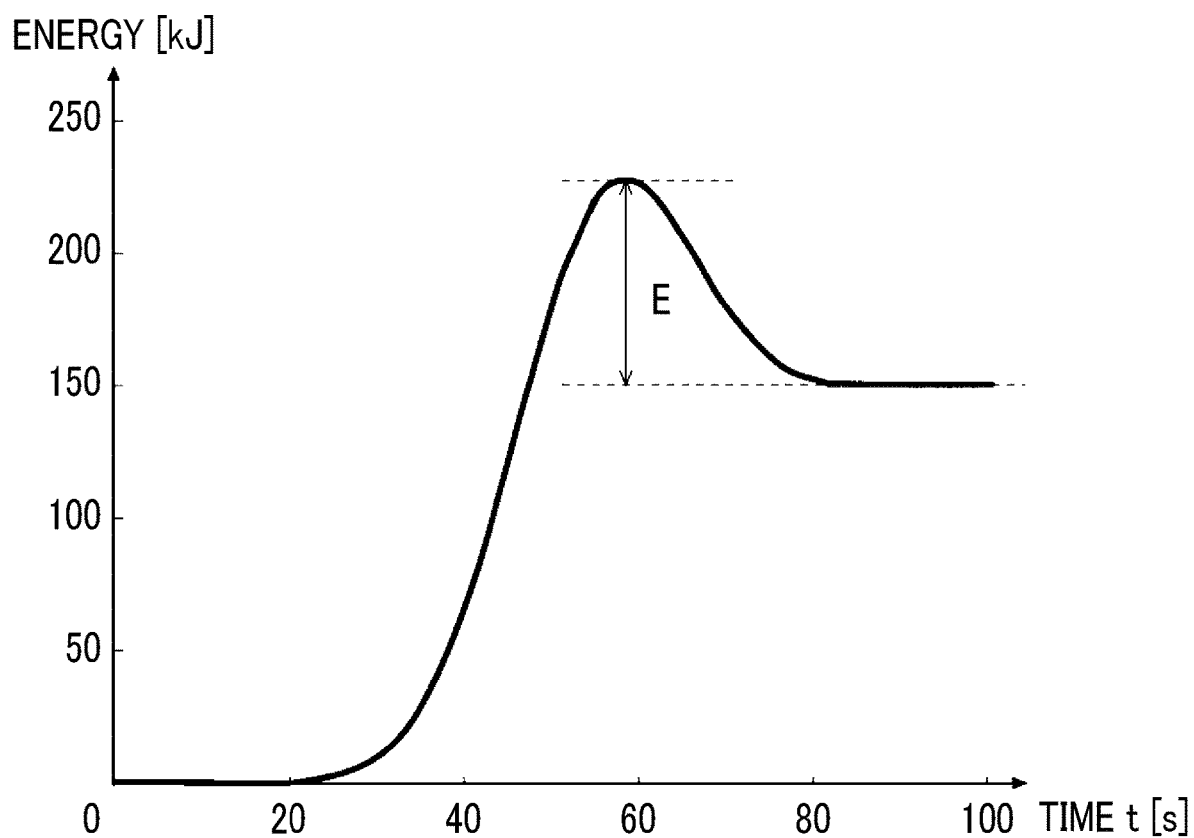
FIG. 9 illustrates a graph of an example of an integral value of the requested power according to the embodiment of the disclosure.

FIG. 9 illustrates a graph of an integral value I(t) from time 0 to time t of the requested power illustrated in FIG. 8, where the horizontal axis represents time, the vertical axis represents energy. I(t) is represented by (Expression 6).

$$I(t) = \int_0^t P(T) dT \quad \text{Expression 6}$$

In FIG. 9, the difference between the energy value at the peak and the energy value when the graph becomes flat after the peak is equal to the estimated value E of the predicted amount of the regenerative energy to be recovered.

As described above, by calculating the integral value of the magnitude of the requested power in the time range in which the requested power becomes negative in any period of the speed profile, a predicted amount of regenerative energy that can be recovered in the period can be estimated.

The weight m of the vehicle and the coefficients a, b, and c are basically constants determined by the characteristics of the vehicle, and good estimation accuracy can be obtained by setting appropriate values. However, in a case where one or more variable factors that can affect the requested power can be acquired, when the following correction is made to at least one of the weight m and the coefficients a, b, and c based on the acquired variable factors, the estimation accuracy can be further improved.

For example, when the loaded weight of an occupant, a package, or the like can be acquired by input from a weight sensor or the like included in the vehicle or a user, the estimation unit 12 may correct the weight m of the vehicle by adding the loaded weight to the weight of the vehicle itself.

When the variable factors such as the type of the road, the gradient of the road, and the traveling resistance such as weather can be acquired, the estimation unit 12 may correct the coefficients a, b, and c by using the variable factors.

For example, when a travel route is set for the current trip, the type of the road and the gradient of the road can be specified, and the coefficients can be corrected using these pieces of information. The information on the type of the road and the gradient of the road may be stored in advance in the storage unit 70 in association with the map information, or may be acquired by the communication unit 80 from an external server or the like. In addition, the coefficients can be corrected using the weather. The information on the weather may be acquired by various sensors included in the vehicle, or may be acquired by the communication unit 80 from an external server or the like.

For example, when the road is relatively slippery such as a gravel road, the traveling resistance is corrected to be larger than when the road is a paved road that is relatively difficult to slip.

In addition, when the gradient of the road indicates an uphill road, the traveling resistance is corrected to be larger than when the road is a flat road, and when the gradient of the road indicates a downhill road, the traveling resistance is corrected to be smaller than when the road is a flat road. In (Expression 4), the influence on the requested power P(t) due to the increase or decrease of the potential energy of the vehicle is reflected by the correction of the traveling resistance based on the gradient of the road.

When the weather is rainy or snowy, the traveling resistance is corrected to be larger than when the weather is sunny. When a travel route is set for the current trip, the traveling direction of the vehicle can be estimated, so that the traveling resistance may be corrected based on the air volume and the wind direction as the weather. For example, when the air volume is not zero, the traveling resistance is corrected to be larger in the case of headwind and smaller in the case of tail wind than when the air volume is zero according to the air volume and the wind direction.

When traveling resistance is corrected as described above, specifically, the values of the coefficients a, b, and c are changed. In this case, the coefficients a, b, and c change depending on the position of the vehicle, but each of the coefficients a, b, and c can be reduced to the function of time t through the approximate expression of (Expression 2). Considering the speed-dependent characteristics of the influence of the variable factors on the traveling resistance, it is possible to appropriately decide which of the coefficients a, b, and c is to be corrected to what extent.

Further, the estimation unit 12 may correct the value of the estimated value E in accordance with the above-described variable factors, instead of or in addition to the above correction. That is, a correction coefficient α (for example, 0≤α≤1) may be set for each period, and correction may be performed as in (Expression 7) such that the estimated value E after the correction decreases as the loaded weight increases or the traveling resistance increases due to the variable factors.

$$E = \alpha \cdot \int_{t1}^{t2} |P(t)| dt \qquad \text{Expression 7}$$

The correction coefficient α may reflect the efficiency of regenerative braking such that the estimated value E after the correction increases as the efficiency of regenerative braking increases. The efficiency of regenerative braking can be derived, for example, based on the rotation speed of the electric motor 31 assumed according to the speed v(t) and an efficiency map corresponding to the rotation speed.

When the period for estimating a predicted amount of regenerative energy in this time (hereinafter referred to as the current period) is the second or later period, the estimation unit 12 further corrects the predicted amount. As will be described below, in each period, in principle, energy is supplied to the electric motor 31 by the amount of driving energy derived in the next step S104 and used for traveling. A value obtained by subtracting the driving energy from a predicted amount of regenerative energy in a period immediately before the current period (hereinafter referred to as the previous period) is a value expected as the increment in the stored energy of the battery 41 in the previous period.

However, due to a mismatch between the speed profile and the actual travel record, a mismatch between the predicted amount of the regenerative energy and the amount that is actually recovered occurs, a mismatch between the expected value and the actual value may occur even in the increment in the stored energy of the battery 41 in the previous period. When such mismatches are accumulated, the stored energy of the battery 41 may be out of an allowable range.

Therefore, a value obtained by subtracting the expected value from the actual value of the increment in the stored energy of the battery 41 in the previous period is set as an error ΔE of the increment in the stored energy of the battery 41 generated in the previous period, and a value obtained by subtracting the error ΔE from the above-described estimated value E is set as a corrected predicted amount E' (=E−ΔE) of the regenerative energy in the current period. That is, the error of the recovered energy in the previous period is absorbed by the predicted amount of the recovered energy in the current period.

By using the predicted amount E' in the subsequent calculations, it is possible to avoid the accumulation of errors in the stored energy of the battery 41. ΔE can be derived based on the predicted amount of regenerative energy and the driving energy in the previous period, and the actual increment in the power storage amount of the battery 41. When the period for estimating a predicted amount of regenerative energy is the first period in this time, the above-described estimated value E may be used as it is and set as the predicted amount E'=E of the regenerative energy.

The specific numerical calculation method for the above process is not limited, and a known calculation algorithm can be used as appropriate. In the present embodiment, by the approximation using a Gaussian function, the characteristics of the speed profile can be expressed with relatively few parameters, so that the amount of calculation can be suppressed. When the function values of the Gaussian function and its derivative with respect to a plurality of numerical values, and the definite integral values of the Gaussian function in a plurality of numerical ranges are prepared in advance as a numerical table and used for the calculation by appropriately referring to the numerical table, the amount of calculation can be further reduced.

(Step S104): The decision unit 13 derives driving energy Ed. The decision unit 13 derives the driving energy to be supplied to the electric motor 31 during the current period based on the predicted amount E' of the regenerative energy in the current period and the thermal information acquired from the heat manager ECU 55. By thus deciding the driving energy to be supplied to the electric motor 31, it is possible to suitably perform heat management such as generation of heat by the internal combustion engine 21 and cooling or heating of the battery 41.

For example, when thermal information indicating a demand to generate a specific amount of heat in the internal combustion engine 21 is acquired from the heat manager ECU 55, the decision unit 13 derives the driving energy Ed so as to be smaller than the predicted amount E' of the regenerative energy. For example, the driving energy Ed can be derived by Ed=β·E' with a coefficient β set to 0<β<1. As a result, in the current period, traveling using the electric motor 31 is suppressed, traveling using the internal combustion engine 21 is promoted, and an increase in the amount of heat generated by the internal combustion engine 21 can be expected.

In addition, for example, when thermal information indicating a demand to release heat from the battery 41 for cooling the battery 41 is acquired from the heat manager ECU 55, the decision unit 13 derives the driving energy Ed so as to be smaller than the predicted amount E' of the regenerative energy. For example, the driving energy Ed can be derived by Ed=β·E' with the coefficient β set to 0<β<1. As a result, in the current period, traveling using the electric motor 31 is suppressed, heat generation due to discharge of the battery 41 is suppressed, the heat balance of the battery 41 is displaced to the heat dissipation dominant side, and cooling of the battery 41 can be expected.

In addition, for example, when thermal information indicating a demand to generate the heat in the battery 41 for heating the battery 41 is acquired from the heat manager ECU 55, the decision unit 13 derives the driving energy Ed so as to be larger than the predicted amount E' of the regenerative energy. For example, the driving energy Ed can be derived by Ed=β·E' with the coefficient β set to 1<β. As a result, in the current period, traveling using the electric motor 31 is promoted, heat generation due to discharge of the battery 41 is promoted, the heat balance of the battery 41 is displaced to the heat generation dominant side, and heating of the battery 41 can be expected.

The decision unit 13 can appropriately set the coefficient$_R$ according to a demanded amount of heat per unit time included in the thermal information, the predicted amount of the regenerative energy, the length of the period, and the like.

(Step S105): The decision unit 13 determines whether or not a condition for traveling using the electric motor 31 is satisfied. In the present embodiment, as an example, the decision unit 13 performs control to switch the traveling mode between an electric motor mode in which solely the electric motor 31 travels, and an internal combustion engine mode in which solely the internal combustion engine 21 travels, in the electric motor 31 and the internal combustion engine 21.

Here, the decision unit 13 appropriately acquires various kinds of information from various sensors included in the vehicle, the driving assistance ECU 60, the motion manager ECU 50, the heat manager ECU 55, the battery ECU 40, and the like, and makes the following determination as an example.

(1) When the intention to decelerate the vehicle is satisfied, determination is made as to whether the following conditions (1-1) to (1-3) are satisfied. The intention to decelerate the vehicle being satisfied means, for example, that while the vehicle is traveling, at least one of a case where the brake pedal operation by a user is performed and a case where the accelerator pedal operation by a user is released is satisfied, or that while the driving assistance function of the driving assistance ECU 60 and the autonomous driving function of the autonomous driving ECU 65 are in operation, instructions indicating deceleration or stop are given from the ECUs.

(1-1) The speed of the vehicle is equal to or higher than a first speed threshold. When the current actual speed of the vehicle is relatively low, a sufficient rotation speed of the electric motor 31 cannot be obtained during regenerative braking, and thus efficient recovery of the regenerative energy cannot be expected. Therefore, determination is made as to whether or not the speed of the vehicle is equal to or higher than the first speed threshold that is set as a speed at which a certain degree of regenerative efficiency can be expected.

(1-2) The requested power is equal to or less than a first power threshold. When the current requested power is relatively large, the internal combustion engine 21 can output the requested power, but since the electric motor 31 generally has a smaller maximum output than the internal combustion engine 21, the electric motor 31 may not be able to output the requested power. Therefore, determination is made as to whether or not the requested power is equal to or less than the first power threshold that is set as a power that can be output by the electric motor 31.

(1-3) The charge rate of the battery 41 is equal to or less than a first charge rate threshold. When the current charge rate of the battery 41 is high, there is a possibility that the entire regenerative energy cannot be stored because the amount of electric power that can be further charged is small. Therefore, determination is made as to whether or not the charge rate of the battery 41 is equal to or less than the first charge rate threshold that is set as a charge rate at which a sufficient amount of electric power can be charged. Note that, for the determination, a power storage amount may be used instead of the charge rate.

When all the determination results of (1-1) to (1-3) are affirmative, the process proceeds to step S106, and otherwise, the process proceeds to step S107.

(2) Except for the above (1), that is, except when the intention to decelerate the vehicle is satisfied, determination is made as to whether the following conditions (2-1) to (2-5) are satisfied.

(2-1) The speed of the vehicle is lower than a second speed threshold. When the current actual speed of the vehicle is relatively high, the internal combustion engine 21 is generally more efficient than the electric motor 31. Therefore, determination is made as to whether or not the speed of the vehicle is lower than the second speed threshold that is set as a speed at which the electric motor 31 can be expected to be more efficient. The second speed threshold is a speed higher than the first speed threshold.

(2-2) The requested power is equal to or less than the first power threshold. For the same reason as the above (1-2), determination is made as to whether or not the requested power is equal to or less than the first power threshold that is set as a power that can be output by the electric motor 31.

(2-3) In the current period, the energy supplied to the electric motor 31 up to the present time is less than the driving energy Ed. When the state of traveling using the electric motor 31 has already been continued and the energy (electric power amount) supplied from the battery 41 to the electric motor 31 has reached the driving energy Ed in the current period, no more energy is supplied to the electric motor 31 to generate the driving force in the current period. Therefore, determination is made as to whether or not the energy supplied to the electric motor 31 is less than the driving energy Ed.

(2-4) Currently, the vehicle is traveling using the internal combustion engine 21, and a first time threshold or more has elapsed since the operation of the internal combustion engine 21 was started. When the operation of the internal combustion engine 21 is stopped immediately after the operation is started, the user may feel a malfunction of the internal combustion engine 21 or instability in vehicle behavior, which may cause discomfort or anxiety. Therefore, determination is made as to whether or not the first time threshold or more, which is set as a sufficient elapsed time that does not cause discomfort or the like even after the operation of the internal combustion engine 21 is stopped, has elapsed since the operation of the internal combustion engine 21 was started.

(2-5) The power storage amount of the battery 41 is equal to or greater than the driving energy Ed. When the power storage amount of the battery 41 is less than the driving energy Ed in the current period, it cannot be said that the power storage amount of the battery 41 is sufficient. Therefore, determination is made as to whether or not the power storage amount of the battery 41 is equal to or greater than the driving energy Ed.

When all the determination results of (2-1) to (2-5) are affirmative, the process proceeds to step S106, and otherwise, the process proceeds to step S107.

(Step S106): The decision unit 13 decides the traveling mode as the electric motor mode. In the present embodiment, the decision unit 13 notifies the travel control ECU 90 that the traveling mode is set as the electric motor mode. The travel control ECU 90 causes the electric motor ECU 30 to control traveling by the electric motor 31.

In the electric motor mode, regenerative braking is performed and the kinetic energy of the vehicle is recovered as electric power. When the user depresses the brake pedal to a large extent, or the driving assistance ECU 60 gives an instruction for rapid deceleration with high priority for avoiding a collision or the like, and deceleration of a certain level or more is demanded, the motion manager ECU 50 and the brake ECU 110 control the brake device 111 to generate a braking force in order to generate a sufficient braking force.

(Step S107): The decision unit 13 decides the traveling mode as the internal combustion engine mode. In the present embodiment, the decision unit 13 notifies the travel control ECU 90 that the traveling mode is set as the internal combustion engine mode. The travel control ECU 90 causes the internal combustion engine ECU 20 to control traveling by the internal combustion engine 21.

(Step S108): The decision unit 13 determines whether or not the vehicle speed is zero. When the vehicle speed is zero, it is regarded that the current period has ended, and the process proceeds to step S103, and when the vehicle speed is not zero, it is regarded that the current period has not yet ended, and the process proceeds to step S105.

The description according to the flowchart of FIG. 2 is as above. In step S108, for example, when the vehicle speed is zero, the creation unit 11 may update the speed profile before the process proceeds to step S103. For example, when the degree of matching between the change in speed over time in actual traveling up to the present time and the speed profile created in step S101 is lower than an appropriately predetermined allowable value, the creation unit 11 may perform modification by compressing or expanding the time scale of the speed profile, and use the modified speed profile for the subsequent process. The degree of matching can be derived by appropriately using a known method. For example, the degree of matching can be derived based on the integral value of the absolute value of the difference between the speed value of the speed profile and the actual speed value in the past fixed period.

Alternatively, the creation unit 11 may select a travel history other than the travel history used to create the current speed profile, create a new speed profile based on the selected travel history, and use the new speed profile for the subsequent process.

In addition, since there is a possibility that the values of the above-mentioned variable factors have changed in such an update, correction may be performed using the latest value. By performing such an update, it is possible to improve the period during which the regenerative energy can be recovered and the estimation accuracy of the predicted amount.

In the above-described embodiment, in each period, in principle, after traveling for the driving energy in the electric motor mode, the mode is switched to the internal combustion engine mode. When the period is short, the traveling modes are switched within the short period, which may give the user a feeling of instability in vehicle behavior. Therefore, in steps S103 to S108, when the length of any of the N periods included in the speed profile is less than a first period, the period and one or more subsequent consecutive periods may be set as one connection period. In this case, the driving energy Ed within the connection period is derived based on the total value of the predicted amount E' of the regenerative energy in each period included in one connection period and the thermal information. That is, in steps S103 and S104, the process may be performed by regarding the connection period as one period, the processes of steps S105 to S107 may be repeated until the end of the connection period, and when the connection period ends, the process may proceed to step S103 to perform the process for the period next to the connection period. As described above, when the length of a period is less than the first period that is set as a sufficient length that does not give a feeling of instability, by connecting the period to the next period, switching between the electric motor mode and the internal combustion engine mode can be reduced, and thus a sense of instability can be suppressed. The length of the connection period is desirably equal to or longer than the first period. Such connection of periods is particularly desirable when using a vehicle speed profile in which traveling and stopping are repeated in a short time, for example, in a section with many signals, in a backstreet, in a parking lot, or the like.

Further, when the vehicle is a plug-in hybrid vehicle, the decision unit 13 may acquire the position of the charging facility, and derive the driving energy Ed such that the stored energy (power storage amount) of the battery 41 becomes small as the vehicle approaches the charging facility. In this case, the coefficient $\beta$ may be gradually increased as the vehicle approaches the charging facility. The method of acquiring the position of the charging facility is not limited. For example, the position of the charging facility may be acquired from the navigation system, and when the vehicle speed profile includes information indicating the charging timing in the charging facility, the information may be acquired. As a result, the power storage amount of the battery 41 at the time of arrival at the charging facility can be made relatively small, and more charging can be performed. When the cost of charging is free or lower than that of gasoline, it will be an advantage for the user.

Further, when the vehicle can provide the electric power of the battery 41 to the outside such as a house, the decision unit 13 may acquire the position of the facility that serves as a providing destination of electric power, and derive the driving energy Ed such that the stored energy (power storage amount) of the battery 41 becomes large as the vehicle approaches the facility of the electric power providing destination. In this case, the coefficient $\beta$ may be gradually decreased as the vehicle approaches the charging facility. The method of acquiring the position of the facility of the providing destination is not limited. For example, the position of the facility of the providing destination may be acquired from the navigation system, and when the vehicle speed profile includes information indicating the timing of electric power provision, the information may be acquired. As a result, the power storage amount of the battery 41 at the time of arrival at the electric power providing destination can be made relatively large, and more electric power can be provided.

Note that, when the above-mentioned coefficient $\beta$ is set within a certain value range and the power storage amount of the battery 41 is simulated, unexpected change in the power storage amount that exceeds the allowable range does not occur, and the stability of the control according to the present embodiment is confirmed.

In the above processes, two traveling modes are set: an electric motor mode in which solely the electric motor 31 is used for traveling and an internal combustion engine mode in which solely the internal combustion engine 21 is used for traveling. Then, by deciding the driving energy to be supplied to the electric motor 31 for traveling using the electric motor 31 based on the prediction of the recovery amount of the regenerative energy and the thermal information acquired from the heat manager ECU 55, heat management such as generation of heat by the internal combustion engine 21 and cooling or heating of the battery 41 is suitably performed. Similarly, the heat management can be performed also in switching control between any two traveling modes among three traveling modes of an electric motor mode, an internal combustion engine mode, and a hybrid mode in which both the electric motor 31 and the internal combustion engine 21 are used for traveling, or switching control between three traveling modes.

For example, when a large amount of heat is demanded to be generated by the internal combustion engine 21, compared with the case where it is not demanded, an opportunity to transition from the internal combustion engine mode to the hybrid mode may be set to be reduced, or an opportunity to transition from the hybrid mode to the electric motor mode may be set to be reduced.

Effect

The travel control device 10 according to the present embodiment can quantitatively predict the recovery amount of the regenerative energy early by using a speed profile in which the speed of the vehicle is predicted. By adjusting the opportunity to travel using the electric motor 31 and the opportunity to travel using the internal combustion engine based on the predicted result and thermal information that demands generation of heat for a specific device, it is possible to perform travel control including suitable heat management of the vehicle.

The travel control device 10 can suppress the number of parameters for calculating the predicted recovery amount of the regenerative energy by approximating the speed profile with a Gaussian function, or suppress the amount of calculation by referring to a numerical table regarding a Gaussian function prepared in advance.

Since the travel control device 10 can create the speed profile based on the travel history of the user or other users, it is possible to estimate a predicted recovery amount of the regenerative energy even if the user has not set a travel route. Further, when the user sets a travel route, the speed profile can be created using the travel route, and the estimation accuracy can be improved.

Since the travel control device 10 corrects the predicted amount based on the variable factors that are considered to affect the recovery amount of the regenerative energy, the estimation accuracy can be improved by reflecting the variable factors.

When the degree of matching between the speed profile and the actual change in vehicle speed over time is low, the travel control device 10 estimates the predicted recovery amount again, and therefore the estimation accuracy can be improved.

When a traveling mode is decided, the travel control device 10 determines which of the internal combustion engine 21 and the electric motor 31 is suitable, based on not only the predicted recovery amount of the regenerative energy and the thermal information but also the charge rate of the battery 41, the speed of the vehicle, the requested power, and the like, in consideration of the storability of the regenerative energy, the operating efficiency, and the feasibility of the requested power, so that the certainty and stability of vehicle control can be improved.

Although one embodiment of the disclosure has been described above, the disclosure can be appropriately modified and implemented. The disclosure can be understood as relating to not only a travel control device, but also a travel control method executed by a travel control device including a processor and a memory, a travel control program, a non-transitory computer-readable storage medium storing a travel control program, a vehicle including a travel control device, and the like.

The disclosure is useful for a travel control device mounted on a vehicle or the like.

What is claimed is:

1. A travel control device mounted on a vehicle, which includes (i) an electric motor and an internal combustion engine that are power sources and (ii) a storage battery that stores energy for driving the electric motor and regenerative energy recovered by regenerative braking of the electric motor, the travel control device comprising an electronic control unit ("ECU") comprising a memory storing at least one program and a processor configured to execute the at least one program so as to:
create a speed profile in which a speed of the vehicle is predicted at a plurality of points of time;
estimate, based on the speed profile, a predicted amount of the regenerative energy to be recovered;
decide the power source to be used for traveling;
estimate, based on the speed profile, the predicted amount of the regenerative energy for each period of a plurality of periods divided at timings when the speed of the vehicle in the speed profile is zero; and
for each of the periods, (i) derive driving energy to be supplied to the electric motor based on thermal information indicating a demand related to heat of the vehicle and the predicted amount of the regenerative energy in the period and (ii) decide, based on an amount of the driving energy, that the driving energy is supplied to the electric motor and is used for traveling, wherein the processor of the ECU is further configured to:
when a length of a first period of the plurality of periods is less than a first length threshold, combine the first period and one or more subsequent consecutive periods that are next after the first period so as to form one connection period that is equal to or longer than the first length threshold;
derive the driving energy to be supplied to the electric motor based on the thermal information and the predicted amount of the regenerative energy in the connection period; and
for the connection period, decide, based on an amount of the driving energy, that the driving energy is supplied to the electric motor and is used for traveling;

wherein the processor of the ECU is further configured to determine whether or not a user of the vehicle intends to decelerate the vehicle; and wherein the processor of the ECU is configured to decide the power source to be used for traveling:
(1) based on the predicted amount of the regenerative energy;
(2) based on the thermal information;
(3) when it is determined that the user of the vehicle intends to decelerate the vehicle, by
(i) determining whether or not the speed of the vehicle is equal to or greater than a first speed threshold at which a certain degree of regenerative efficiency can be expected,
(ii) determining whether or not power requested by the user is equal to or less than a first power threshold, which is set as an amount of power that can be output by the electric motor, and
(iii) determining whether or not a charge rate of the battery is equal to or less than a first charge rate threshold, which is a charge rate at which an entirety of the regenerative energy can be stored in the battery; and
(4) when it is determined that the user of the vehicle does not intend to decelerate the vehicle, by
(i) determining whether or not the speed of the vehicle is lower than a second speed threshold at which the electric motor is expected to be more efficient than the internal combustion engine, the second speed threshold being greater than the first speed threshold, (ii) determining whether or not the power requested by the user is equal to or less than the first power threshold,
(iii) determining whether or not energy supplied to the electric motor is less than the driving energy,
(iv) determining whether or not a first time threshold has elapsed since operation of the internal combustion engine was started, and
(v) determining whether or not a power storage amount of the battery is equal to or greater than the driving energy.

2. The travel control device according to claim 1, wherein the ECU is configured to derive the driving energy so as to be smaller than the predicted amount of the regenerative energy when a demand to generate exhaust heat of the internal combustion engine is acquired as the thermal information.

3. The travel control device according to claim 1, wherein the ECU is configured to derive the driving energy so as to be smaller than the predicted amount of the regenerative energy when a demand to cool the storage battery is acquired as the thermal information.

4. The travel control device according to claim 1, wherein the ECU is configured to derive the driving energy so as to be larger than the predicted amount of the regenerative energy when a demand to heat the storage battery is acquired as the thermal information.

5. The travel control device according to claim 1, wherein the ECU is configured further to acquire a position of a charging facility and to derive the driving energy such that stored energy of the storage battery becomes small as the vehicle approaches the charging facility.

6. The travel control device according to claim 1, wherein the ECU is configured further to acquire a position of a facility of an electric power providing destination and to derive the driving energy such that stored energy of the storage battery becomes large as the vehicle approaches the facility of the electric power providing destination.

7. The travel control device according to claim 1, wherein the ECU is configured to create the speed profile based on a past travel history.

8. A travel control method executed by a travel control device mounted on a vehicle, which includes (i) an electric motor and an internal combustion engine that are power sources and (ii) a storage battery that stores energy for driving the electric motor and regenerative energy recovered by regenerative braking of the electric motor, the travel control method comprising:
creating a speed profile in which a speed of the vehicle is predicted at a plurality of points of time;
estimating, based on the speed profile, a predicted amount of the regenerative energy to be recovered;
deciding the power source to be used for traveling;
estimating, based on the speed profile, the predicted amount of the regenerative energy for each period of a plurality of periods divided at timings when the speed of the vehicle in the speed profile is zero; and
for each of the periods, (i) deriving driving energy to be supplied to the electric motor based on thermal information indicating a demand related to heat of the vehicle and the predicted amount of the regenerative energy in the period and (ii) deciding, based on an amount of the driving energy, that the driving energy is supplied to the electric motor and is used for traveling,
wherein the travel control method also comprises:
when a length of a first period of the plurality of periods is less than a first length threshold, combining the first period and one or more subsequent consecutive periods that are next after the first period so as to form one connection period that is equal to or longer than the first length threshold;
deriving the driving energy to be supplied to the electric motor based on the thermal information and the predicted amount of the regenerative energy in the connection period; and
for the connection period, deciding, based on an amount of the driving energy, that the driving energy is supplied to the electric motor and is used for traveling;
wherein the travel control method further comprises determining whether or not a user of the vehicle intends to decelerate the vehicle; and
wherein the power source to be used for traveling is decided:
(1) based on the predicted amount of the regenerative energy;
(2) based on the thermal information;
(3) when it is determined that the user of the vehicle intends to decelerate the vehicle, by
(i) determining whether or not the speed of the vehicle is equal to or greater than a first speed threshold at which a certain degree of regenerative efficiency can be expected,
(ii) determining whether or not power requested by the user is equal to or less than a first power threshold, which is set as an amount of power that can be output by the electric motor, and
(iii) determining whether or not a charge rate of the battery is equal to or less than a first charge rate threshold, which is a charge rate at which an entirety of the regenerative energy can be stored in the battery; and
(4) when it is determined that the user of the vehicle does not intend to decelerate the vehicle, by
(i) determining whether or not the speed of the vehicle is lower than a second speed threshold at which the electric motor is expected to be more efficient than the internal combustion engine, the second speed threshold being greater than the first speed threshold,
(ii) determining whether or not the power requested by the user is equal to or less than the first power threshold,
(iii) determining whether or not energy supplied to the electric motor is less than the driving energy,
(iv) determining whether or not a first time threshold has elapsed since operation of the internal combustion engine was started, and
(v) determining whether or not a power storage amount of the battery is equal to or greater than the driving energy.

9. A non-transitory storage medium storing instructions that are executable by one or more processors mounted on a vehicle, which includes (i) an electric motor and an internal combustion engine that are power sources and (ii) a storage battery that stores energy for driving the electric motor and regenerative energy recovered by regenerative braking of the electric motor, and that cause the one or more processors to perform functions comprising:
creating a speed profile in which a speed of the vehicle is predicted at a plurality of points of time;

estimating, based on the speed profile, a predicted amount of the regenerative energy to be recovered;
deciding the power source to be used for traveling;
estimating, based on the speed profile, the predicted amount of the regenerative energy for each period of a plurality of periods divided at timings when the speed of the vehicle in the speed profile is zero; and
for each of the periods, (i) deriving driving energy to be supplied to the electric motor based on thermal information indicating a demand related to heat of the vehicle and the predicted amount of the regenerative energy in the period and (ii) deciding, based on an amount of the driving energy, that the driving energy is supplied to the electric motor and is used for traveling,
wherein the functions performed by the one or more processors also comprise:
when a length of a first period of the plurality of periods is less than a first length threshold, combining the first period and one or more subsequent consecutive periods that are next after the first period so as to form one connection period that is equal to or longer than the first length threshold;
deriving the driving energy to be supplied to the electric motor based on the thermal information and the predicted amount of the regenerative energy in the connection period; and
for the connection period, deciding, based on an amount of the driving energy, that the driving energy is supplied to the electric motor and is used for traveling;
wherein the functions performed by the one or more processors also comprise determining whether or not a user of the vehicle intends to decelerate the vehicle; and
wherein the power source to be used for traveling is decided:
(1) based on the predicted amount of the regenerative energy;
(2) based on the thermal information;
(3) when it is determined that the user of the vehicle intends to decelerate the vehicle, by
(i) determining whether or not the speed of the vehicle is equal to or greater than a first speed threshold at which a certain degree of regenerative efficiency can be expected,
(ii) determining whether or not power requested by the user is equal to or less than a first power threshold, which is set as an amount of power that can be output by the electric motor, and
(iii) determining whether or not a charge rate of the battery is equal to or less than a first charge rate threshold, which is a charge rate at which an entirety of the regenerative energy can be stored in the battery; and
(4) when it is determined that the user of the vehicle does not intend to decelerate the vehicle, by
(i) determining whether or not the speed of the vehicle is lower than a second speed threshold at which the electric motor is expected to be more efficient than the internal combustion engine, the second speed threshold being greater than the first speed threshold,
(ii) determining whether or not the power requested by the user is equal to or less than the first power threshold,
(iii) determining whether or not energy supplied to the electric motor is less than the driving energy, (iv) determining whether or not a first time threshold has elapsed since operation of the internal combustion engine was started, and
(v) determining whether or not a power storage amount of the battery is equal to or greater than the driving energy.

10. A vehicle comprising:
an electric motor that is a power source;
an internal combustion engine that is a power source;
a storage battery that stores energy for driving the electric motor and regenerative energy recovered by regenerative braking of the electric motor; and
an electronic control unit ("ECU") comprising a memory storing at least one program and a processor configured to execute the at least one program so as to:
create a speed profile in which a speed of the vehicle is predicted at a plurality of points of time;
estimate, based on the speed profile, a predicted amount of the regenerative energy to be recovered;
decide the power source to be used for traveling;
estimate, based on the speed profile, the predicted amount of the regenerative energy for each period of a plurality of periods divided at timings when the speed of the vehicle in the speed profile is zero; and
for each of the periods, (i) derive driving energy to be supplied to the electric motor based on thermal information indicating a demand related to heat of the vehicle and the predicted amount of the regenerative energy in the period and (ii) decide, based on an amount of the driving energy, that the driving energy is supplied to the electric motor and is used for traveling,
wherein the processor of the ECU is further configured to:
when a length of a first period of the plurality of periods is less than a first length threshold, combine the first period and one or more subsequent consecutive periods that are next after the first period so as to form one connection period that is equal to or longer than the first length threshold;
derive the driving energy to be supplied to the electric motor based on the thermal information and the predicted amount of the regenerative energy in the connection period; and
for the connection period, decide, based on an amount of the driving energy, that the driving energy is supplied to the electric motor and is used for traveling;
wherein the processor of the ECU is further configured to determine whether or not a user of the vehicle intends to decelerate the vehicle; and
wherein the processor of the ECU is configured to decide the power source to be used for traveling:
(1) based on the predicted amount of the regenerative energy;
(2) based on the thermal information;
(3) when it is determined that the user of the vehicle intends to decelerate the vehicle, by
(i) determining whether or not the speed of the vehicle is equal to or greater than a first speed threshold at which a certain degree of regenerative efficiency can be expected,
(ii) determining whether or not power requested by the user is equal to or less than a first power threshold, which is set as an amount of power that can be output by the electric motor, and
(iii) determining whether or not a charge rate of the battery is equal to or less than a first charge rate threshold, which is a charge rate at which an entirety of the regenerative energy can be stored in the battery; and (4) when it is determined that the user of the vehicle does not intend to decelerate the vehicle, by
   (i) determining whether or not the speed of the vehicle is lower than a second speed threshold at which the electric motor is expected to be more efficient than the internal combustion engine, the second speed threshold being greater than the first speed threshold,
   (ii) determining whether or not the power requested by the user is equal to or less than the first power threshold,
   (iii) determining whether or not energy supplied to the electric motor is less than the driving energy,
   (iv) determining whether or not a first time threshold has elapsed since operation of the internal combustion engine was started, and
   (v) determining whether or not a power storage amount of the battery is equal to or greater than the driving energy.

\* \* \* \* \*